Dec. 10, 1946.    D. SILVERMAN    2,412,363

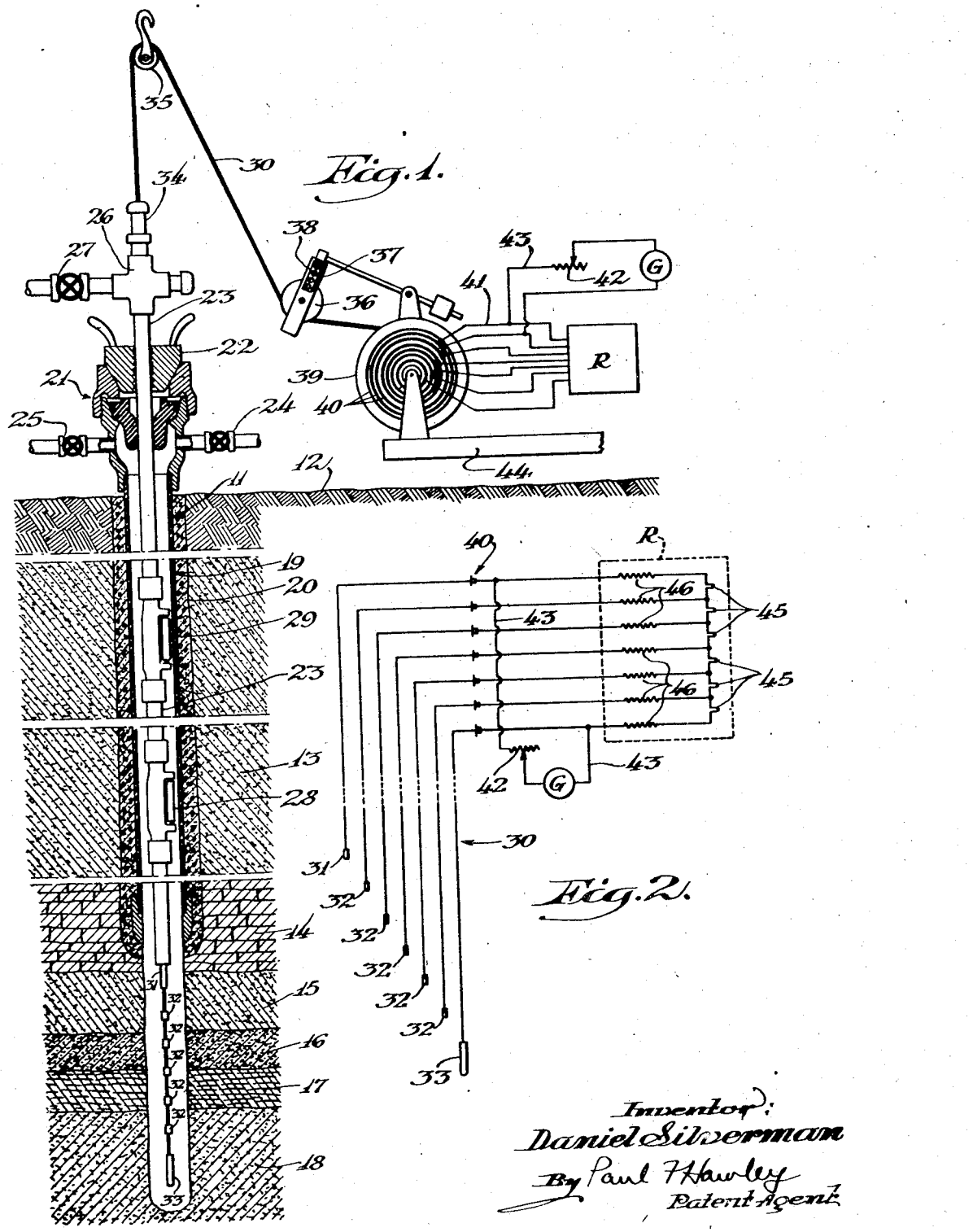

WELL LOGGING

Filed Jan. 14, 1942    3 Sheets-Sheet 2

Inventor:
Daniel Silverman
By Paul F Hawley
Patent Agent

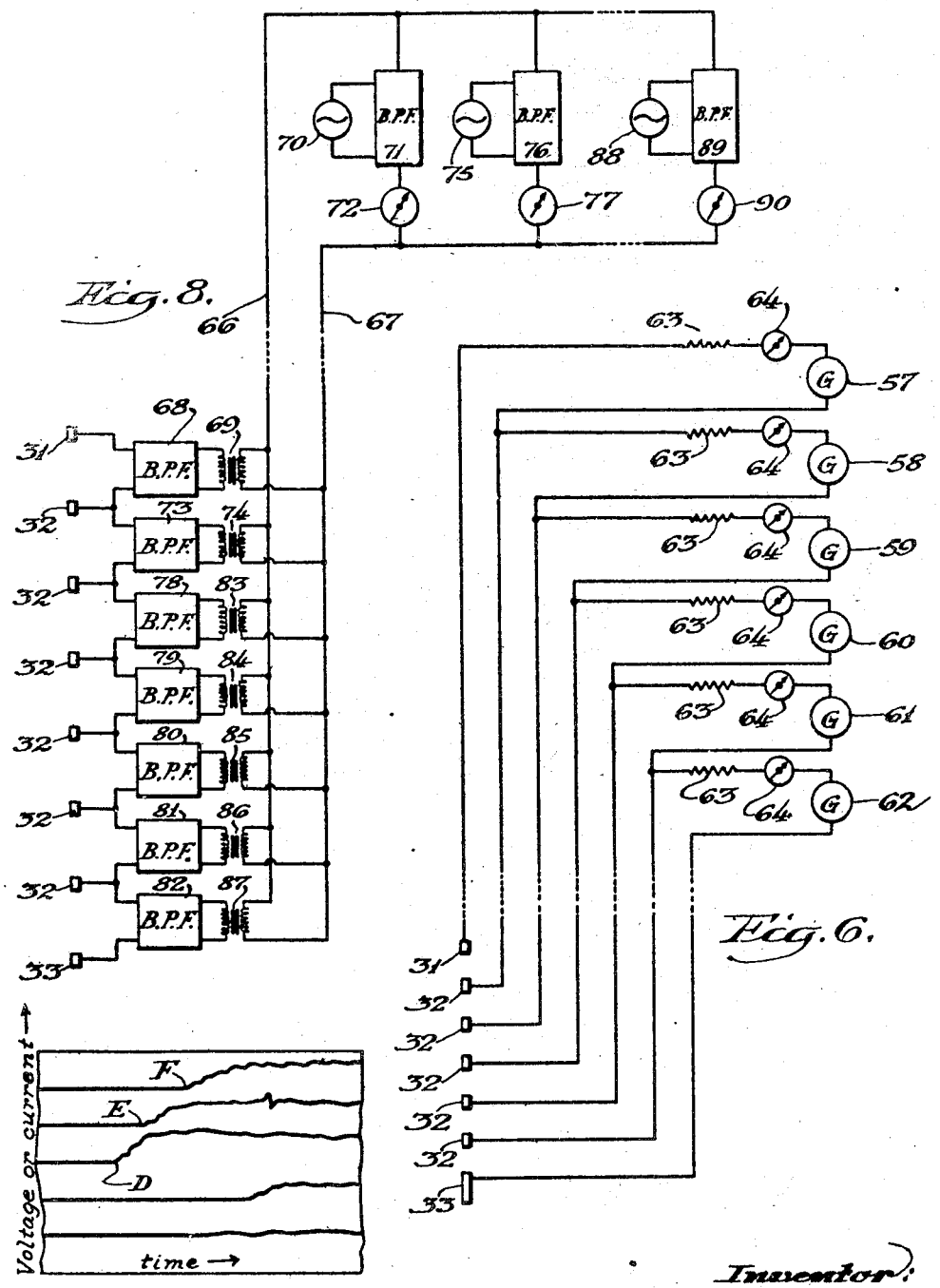

Patented Dec. 10, 1946

2,412,363

UNITED STATES PATENT OFFICE 2,412,363

WELL LOGGING

Daniel Silverman, Tulsa, Okla., assignor to Stanolind Oil and Gas Company, Tulsa, Okla., a corporation of Delaware Application January 14, 1942, Serial No. 426,713

4 Claims. (Cl. 175—182)

This invention pertains to the art of detecting the zones of entry of fluid into a well. While it has particular application to the location of a zone of ingress of salt water into an oil or gas well, it is not limited in its application to this embodiment.

It is an object of this invention to provide a method and means for expeditiously determining the region of ingress of a fluid into a well without the necessity of moving equipment up or down through the region to be tested in the well during the test period. As a result it is possible to investigate the region desired without any difficulty in contaminating points in this region with fluids flowing from other regions due to a stirring action of equipment raised or lowered in the well.

It is another object of this invention to provide such a method and means in which there is a substantially simultaneous investigation of the entire region of investigation during the test period by dividing the region into contiguous zones for each of which an indication is produced during the time that the test is carried on.

It is a further object of this invention to provide such a method and means in which the equipment in the well is connected to a recording station by a minimum number of insulated conductors. Other objects and advantages of this invention will become apparent upon perusal of this specification.

In order to better explain the operation of this method and some of its advantages, certain embodiments of the invention have been illustrated in the appended drawings. The invention is not limited solely to the embodiments shown and described but has much wider application. In these figures the same reference numeral in several figures indicates the same or a corresponding part.

Figure 1 shows a diagrammatic cross section through a well traversing various formations in the crust of the earth and certain equipment illustrating one embodiment of this invention;

Figure 2 is a circuit diagram of the equipment shown in diagrammatic form in Figure 1;

Figure 6 is a circuit diagram of still another embodiment of my invention;

Figure 7 is a representation of a portion of a record obtained with the equipment shown in Figure 6; and Figure 8 is a circuit diagram of another embodiment of my invention.

Figure 3:
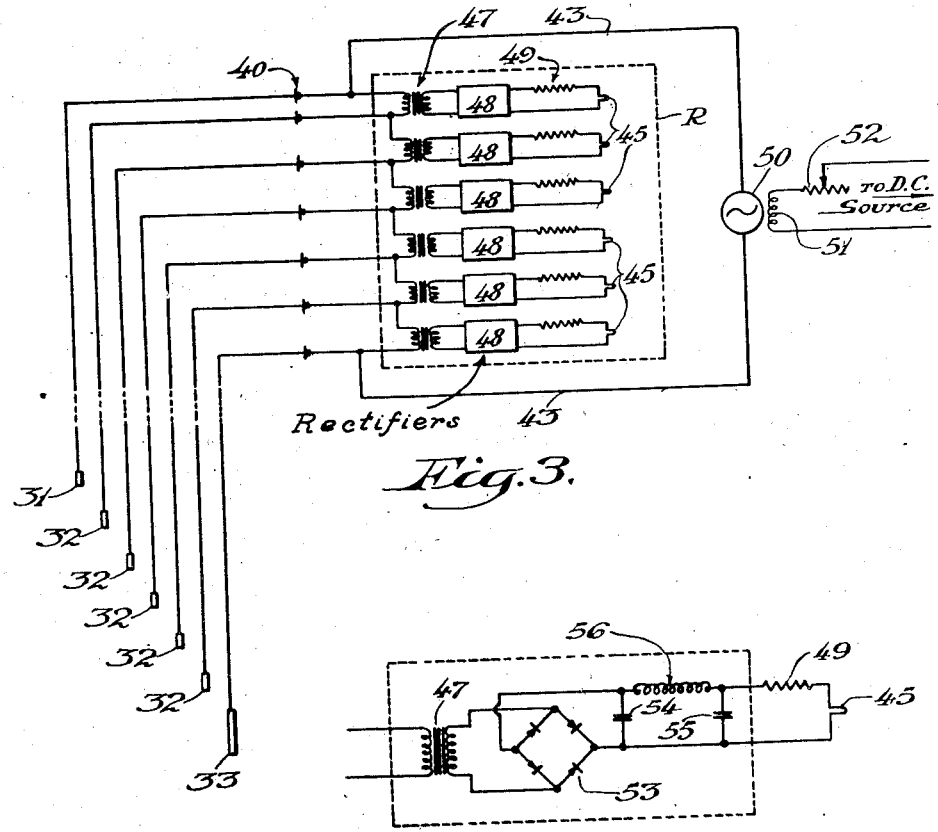
Figure 3 is a circuit diagram of a second embodiment of this invention.

In Figure 1 a well indicated generally at 11 is shown extending downward from the surface 12 of the earth and penetrating certain formations 13 to 18. A casing or pipe 19 has been cemented by cement 20 in this well, terminating in formation 14. At elevations below this point the formations such as 15, 16, 17 and 18 have been exposed and are in the uncased portion of the well. At the surface of the well a conventional casinghead indicated generally by numeral 21 has been provided, closing off the top of casing 19.

Suspended by slips 22 in the casinghead 21 is the tubing 23. The lower end of this tubing terminates at some point in the lower end of the well. Two valved lines 24 and 25 provide access to the annular space between the tubing and the casing. The tubing 23 is supplied with a cross 26 and a valved line 27 by means of which the valuable fluids from the well, for example oil and gas, can be removed. Normally the other arms of the cross are plugged.

It is assumed in the well shown that the flowing or flush period of the well has passed and that it has been necessary to produce the well by means of gas lift. As will be described later, this invention is not limited to wells which are being produced in this manner but is likewise applicable to flowing wells and to wells which are pumped or produced by other methods. In this particular well in order to produce the well with the gas lift, a number of flow valves are supplied such as, for example 28 and 29. These are attached to the flow string in a manner well known in this art.

At some time in the production history of this well, water has started to encroach. This water is normally in the form of a brine or salt solution which after contact with the various formations has become highly impregnated with various salts found in these formations. It is highly desirable to seal off the section of the uncased portion of the well through which the water is passing in order to produce the amount of fluid which must be produced and restrict the production to the desired fluids, in this case oil and gas.

If the water is entering through the bottom formation 18 it is a fairly simple job to close off this formation by dumping a small amount of cement in the bottom of the well. Likewise as soon as it is known that water is coming through into the well at a higher formation, for example formation 16, it is possible to cement off this formation only, leaving the rest of the well open for further production. However, it is recognized that it is tremendously vital that the area or zone in which the salt water ingress is occurring be accurately determined, as otherwise much time and expense may occur in indiscriminately cementing off valuable production sections without securing a good water shut-off.

I have found that it is possible by practicing the invention outlined herein, to divide the region of investigation into a number of contiguous zones, and measure simultaneously by means of electric equipment an electrical characteristic of each zone simultaneously while producing the well. By this means it is possible to localize the region of water production and thereafter cement it off without difficulty.

In practicing this invention it is desirable, first to stop ingress of all fluids from earth formations into the well, and next to "condition" the region of investigation by displacing the fluid which is already present in the zone of ingress which it is desired to locate. Thus, for example in Figure 1, any water which is present in the uncased portion of the well should be eliminated after the production of this well has been stopped. This can be done very simply by removing the plug from the top of the cross 26 and lowering through the tubing a string of smaller tubing or "macaroni" tubing, the lower end of which is finally placed near the bottom of the well. Relatively pure water, or a high resistivity drilling mud is then circulated down through the macaroni tubing and up through the regular tubing, passing out through the valved line 27 into a tank, mud pit, or the like. If it is desired to keep line 27 uncontaminated with these materials it is simply necessary to remove the plug from the opposite cross arm, after which the material is circulated out at this point. By this means, it is easily possible to displace all of the well fluids in the region of investigation with a fluid which has a marked difference in electrical resistivity from the fluid to be detected, namely, the salt water. It is obvious that it is desirable during this process to shut off the flow of gas which was previously pumped into valved line 24 when the well was operated on gas lift, in order to satisfactorily accomplish the desired conditioning of the well. Shutting off that gas stops the well production. The circulation of material into the well is stopped, the operator taking care to maintain a sufficient hydrostatic head in the tubing so that no formation fluid will flow into the well during this period. The macaroni tubing is then removed from the tubing 23 and an array of electrodes suspended on the end of a cable 30 is lowered into the well. This array consists of a top electrode 31, a series of intermediate electrodes 32 and a bottom electrode 33, which preferably is made somewhat longer and heavier than the intermediate electrodes and hence serves as a weight to carry the array to the bottom. The cable 30 is supplied with only one insulated conductor for each of the electrodes in the array. In the case shown, there are seven conductors in the cable.

The positioning of the electrode array defines a plurality of contiguous zones. Each of the electrodes except for the two end electrodes 31 and 33 establishes the boundary between two adjacent zones, one above the other. Electrodes 31 and 33 establish the top and bottom boundaries of the topmost and lowermost of the contiguous zones, respectively.

At the top of the well, the cable passes out through the stuffing box 34 over a pulley 35 which is supported by a framework (not shown). It then passes by the pulley 36 of a depth counter 37 which is provided with a dial 38 graduated in feet, by means of which the depth of the electrode array in the well can be determined. The cable is wound upon a power driven reel 39 which is provided with a brake (not shown), or other means for maintaining the electrodes stationary relative to the formation at any desired depth. Mounted on the reel 39 are a number (in this case seven) of slip rings which are insulated from the reel and from each other. Each one of these slip rings 40 is attached through an insulated conductor in the cable 30 to one of the electrodes in the well. An array of brushes is provided, one bearing against each of the slip rings 40. Each of these brushes is attached to an insulated electrical conductor in a cable 41 which passes into a recording apparatus or oscillograph R. In this particular embodiment of the invention, a generator of electricity G is connected in series with a rheostat 42, by means of which the current output of the generator can be controlled across electrodes 31 and 33 in the well. This connection is accomplished by means of conductors 43 which are attached to the conductors in the cable 41 making contact with the slip rings connected to electrodes 31 and 33. The entire apparatus shown is normally carried on a truck of which only the truck bed 44 is diagrammatically shown.

A means for producing a visual indication of the potential drop between each two adjacent electrodes is provided in the recorder or oscillograph R. This circuit is shown in Figure 2.

In this figure each adjacent pair of electrodes in the array is connected to a single recording galvanometer element 45 in the recorder. A high resistance 46 is connected in each lead to the galvanometer in order to regulate the sensitivity of the galvanometer element 45. The recorder R can be preferably a recording oscillograph of any of the well known types, producing a record against time of the current flowing in the various recording galvanometers. As the details of recording apparatus are quite conventional and as it is not particularly material what type of recorder is used, further description of these details is omitted. If the generator G is of the direct current type, the recording galvanometer unit R is likewise direct current. If on the other hand the generator G produces alternating current, alternating current galvanometer elements are used.

As is shown in Figure 2, the generator is connected between the top and bottom electrodes 31 and 33. When this array of electrodes is in the well a current flows between these two electrodes, the magnitude of which depends upon the resistivity of the material in the well between the electrodes in the region of investigation as modified by the resistivity of formations adjacent the well, and on the setting of the rheostat 42. Between each pair of adjacent electrodes will appear a portion of this voltage in such manner that the summation of the voltage between adjacent electrodes is equal to the total potential drop between electrodes 31 and 33. Thus each adjacent pair of electrodes produces a voltage which is indicative of the resistance of the zone defined by the position of the two electrodes. It is apparent that the section of the well between electrode 31 and electrode 33 has been divided into a number of zones which is equal in number to one less than the number of eelctrodes, and that these zones are contiguous, i. e., adjacent zones are in contact.

After the electrode array has been placed in the conditioning fluid in the well at the region of investigation, the brake on reel 39 is set, and thereafter during the test period the electrodes are maintained stationary with respect to the region of investigation. The generator G is then energized and current flows between the end electrodes 31 and 33. The actual test for the determination of the zone of ingress of the salt water is then ready to proceed. By means of valved line 24 or 25, gas is passed under pressure into the well, thereby gas-lifting some of the column of conditioning material present in the tubing 23. As this material passes out of the tubing, the hydrostatic head at the permeable formations 15 to 18 decreases, and formation fluid from these formations is caused to flow into the well. As soon as salt water is present in one of the contiguous zones, the resistance of that zone decreases markedly and correspondingly the potential drop across the two electrodes, defining the upper and lower boundary of this zone, drops. At the same time, since the resistance between the electrodes 31 and 33 has been decreased by this entrance of salt water, an increased current flows between them, thus raising the potential across each of the other contiguous zones and thereby increasing the deflection of the corresponding galvanometer elements. Thus the presence of the salt water is immediately evident in two ways; first, there is a very abrupt decrease in the deflection of the galvanometer unit across the pair of electrodes defining the zone in which the salt water is entering. There is, secondly, an increase in the potential across each of the other galvanometer units and hence an increase in their deflection.

Figure 5:
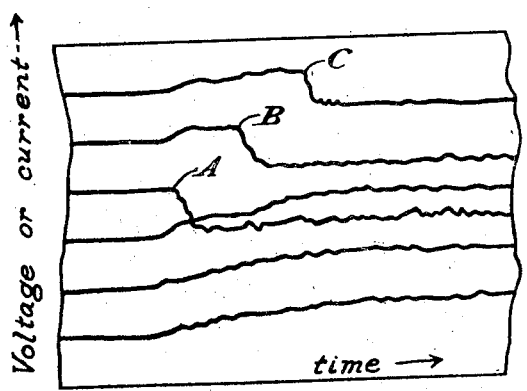
Figure 5 is a representation of a portion of a record taken with the recording apparatus shown in either Figure 2 or 3.

As soon as the salt water has entered the well, it will diffuse, due to its ionic mobility throughout the column of conditioning material present in the well. This dynamic procedure takes place rapidly so that in a very short time after there is a drop of resistance in the original zone, the resistance of the next adjacent zone in the direction of water flow, (either up or down depending upon the rate of production of the well and the specific gravity of the conditioning liquid), shows a corresponding drop. There is a rise in potential across the remaining zones, since there has been further increase in the current between electrodes 31 and 33. Thus in turn each of the zones between the initial zone of water entry and the final zone defined by electrode 31 or 33 is in turn contaminated by the salt water and the drop across this zone correspondingly decreases. The resultant oscillogram or record produced by this process will appear somewhat as shown in Figure 5. In this figure each of the lines from top to bottom represents the drop of potential across a pair of adjacent electrodes in the electrode array. Thus the top line represents the drop between electrode 31 and the first of electrodes 32, while the lowest line represents the drop between the lowest electrode 32 and the electrode 33. The time axis is indicated on this figure. It is apparent from an inspection of this figure that at the point marked A on this record, the third zone from the top was contaminated by salt water and that thereafter the two zones above this zone were similarly contaminated at points B and C, corresponding to later times. At point A it is also seen that the drop across all of the adjacent electrodes except the third and fourth electrodes from the top increased, which was due to the increase in total current between electrodes 31 and 33. These drops increased as the salt water in the zone of investigation increased during the test period. From an inspection of this record, it is apparent that it is extremely easy to detect the zone of ingress of the salt water. In this particular case it is apparent that the ingress can only occur between the third and fourth electrodes from the top of the array. If the zone of ingress were sufficiently large to affect two of the contiguous zones simultaneously, drops such as shown at point A would be found on the record simultaneously, at the two points of water entry. The same type of effect would be found if there were two zones of entry which were far enough apart so that they affected different parts of the region of investigation. Furthermore, it is also apparent from an inspection of Figure 1 and a consideration of Figure 5 that there is no point in the total zone of investigation between electrode 31 and electrode 33 at which water can enter without immediately affecting the drop of potential between the various electrodes. If the zones defined by each pair of electrodes were not contiguous this result would not be obtained. Therein lies a very marked advantage of this system of investigation. No possible error due to migration of the water is possible. Another advantage which is also apparent from these figures is that the point of initial water entry is apparent not only from the drop of potential of the one pair of electrodes, but by the rise of potential of all of the others.

In Figure 3 I have shown an alternative arrangement of apparatus utilizing a source of alternating current. I have found that the use of alternating current instead of direct current is advantageous with regard to the flow of current between the electrodes in the well, since there is practically no polarization. On the other hand, it is often desirable to use direct current galvanometer elements in the oscillograph recorder R. Accordingly, the apparatus shown in Figure 3 is arranged to operate with alternating current impressed across the electrodes but with direct current galvanometer recording. Here each pair of adjacent electrodes is connected across the primary of a transformer 47, the secondary of which is connected to a rectifying system 48. The output of the rectifying system 48 is connected through a resistance 49 to the galvanometer element 45. The alternator 50 or other source of alternating current is connected by means of conductors 43 across the electrodes 31 and 33. The field coils 51 of this alternator are connected through a rheostat 52 to a suitable direct current source. The field rheostat 52 is used to regulate the voltage output of the alternator 50 and hence its current output. The frequency of the alternating current can be chosen to lie between the ranges of the order of 25 cycles per second to the order of 100,000 per second, or even higher if desired.

Figure 4:
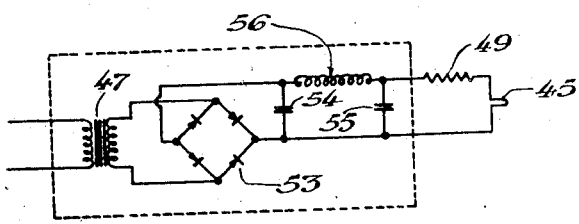
Figure 4 is a circuit diagram of a portion of the apparatus shown in Figure 3.

In Figure 4, the transformer 47 and the rectifying system 48 are shown in greater detail. The output of the transformer 47 is connected across a rectifier which can be, for example, a full-wave copper oxide rectifier 53 as shown in Figure 4, or any other type of rectifier known in the art. The output of this rectifier passes through a low-pass filter to "smooth out" the alternating current ripple so that the deflection of the galvanometer 45 will be substantially a steady-state deflection. In this figure, this low-pass filter is shown as made up of by-pass condensers 54 and 55 and series inductance 56. However, any other type of low-pass filter desired may be used at this point. By means of this circuit the alternating current potential drop across each pair of adjacent electrodes is rectified and appears as a steady-state deflection of the galvanometer element 45. Otherwise the operation of this system is similar to that shown in Figure 2.

In Figure 6 another embodiment of this invention is shown. In this particular case an individual generator is employed to pass the current across each of the contiguous zones. Thus, for example, the generator 57 passes current between electrode 31 and the top electrode 32. Generator 58 passes current between the first two electrodes 32 from the top, and so on. A means for controlling the current flow from each generator is incorporated in the circuit. Thus, for example, a resistance 63 can be incorporated in each generator circuit. A means for producing a visual indication of the amount of current flow through each generator circuit is supplied in that generator circuit. In this figure these are shown as meters 64 although it will often be found that oscillograph galvanometer elements similar to elements 45 can be employed with suitable current shunts well known in the oscillograph recording art. Each of the meters 64 produces an indication of the current flowing between the two adjacent electrodes to which the corresponding generator is connected. Therefore, after the array of electrodes has been lowered into the previously conditioned well and maintained stationary opposite the region of investigation, the well is caused to produce, and the deflection of each meter 64 is observed, or in the case of the oscillograph galvanometer type of meter, is recorded. The record of this type of meter is shown in a section of record in Figure 7. It will be seen in this record that the deflection of each meter has no relation to the deflection of any other meter but that the deflection of the meter affected by the zone in which the salt water first appears has an increased deflection immediately thereafter. The meter affected by the next zone to this in direction of salt water flow experiences a corresponding deflection a short time later, and so on. The point at which the salt water influences each zone is shown in Figure 7 by the points D, E and F. From a study of this record it is apparent that the operator can ascertain immediately which of the contiguous zones was first affected by the entry of the salt water.

In some instances it is highly desirable to limit the number of conductors used in the well to at most two. In Figure 8 a circuit diagram of an apparatus in accordance with my invention is shown in which only two conductors are used in the main body of the well. These two conductors 66 and 67 are connected at one end to the surface apparatus and at the other end through auxiliary apparatus to the electrodes in the well. Each two electrodes, for example electrode 31 and the top electrode 32, which define the upper and lower limits of the top zone of the region to be investigated, are connected through a band pass filter 68 and transformer 69 to the two conductors 66 and 67. At the surface of the earth an alternating current generator 70 is connected to a filter 71, the output of which is connected in series with an indicating or recording meter 72 across conductors 66 and 67. The generator 70, the filter 71 and the filter 68 are all tuned to the same frequency. It is apparent, therefore, that the indication on meter 72 is inversely proportional to the resistance between electrodes 31 and 32. A second filter 73 tuned to a different frequency from that used in the filter 68 is similarly connected through a transformer 74 to the two conductors 66 and 67, with the two top electrodes 32 connected in this circuit. At the surface a generator 75 and a filter 76 tuned to the same resonant frequency as that of filter 73, and a meter 77 are used to indicate or record the current output of the generator 75. Filters 78 to 82 are similarly connected through transformers 83 to 87 respectively to the conductors 66 and 67 at lower points in such a manner that associated with each filter is one set of two electrodes. At the surface of the ground are the same number of generators 88, filters 89, and meters 90 as there are filters 78 to 82 in the well, each of which is tuned to the frequency of one of the filters in the well. Each of the filters 68, 73, 78—82 is tuned to a different frequency, preferably considerably different from the frequency of any other filter or the first few harmonics (for example up to the fourth harmonic) of the tuned frequency of the other filters. For each of the filters 68, 73, and 78 to 82 there is a corresponding filter in the group 71, 76, and 89 at the surface that has an identical frequency response. One such set of frequencies which could be used, for example, is 75, 170, 260, 370, 470, and 570 cycles per second. This is merely one example of many such sets of frequencies which can be employed, if desired.

By this means each generator is connected through a filter which removes all frequencies except the desired frequency band so that, for example meter 72, can respond only to the variation in resistance between electrode 31 and top electrode 32, meter 77 is responsive to the resistance only between the top two electrodes 32, and so on. The resistance between the bottom electrode 32 and the electrode 33 cannot affect the reading of meters 72, 77 or any of the other meters 90 except that associated with the particular filter tuned to the same frequency band as that of filter 82. In this particular drawing only three generator, filter and meter combinations are shown at the surface of the ground, for convenience in representation. It is to be understood, however, that there are as many generator, filter, and meter combinations at the surface as there are filters in the well.

In practice I find that the spacing between adjacent electrodes can be between three inches and approximately ten feet. I prefer to use a separation of the order of six inches to the order of five feet.

The method and apparatus herein revealed can be used not only for the detection of one or more zones of salt water ingress into a well but it can be used to detect the zone or zones of ingress of any fluid which flows into a well by suitable choice of the conditioning fluid. Thus, for example, if it were desired to detect the presence of oil flowing into a well, the conditioning fluid would be one the resistance of which varied markedly from that of the oil, i. e., quite low. In this case salt water could conveniently be used for the conditioning fluid and the entry of the oil into the well would be indicated by an increase in resistance and a corresponding change in the galvanometer deflection. Also, the presence of both oil and salt water can be detected in the same well by noticing whether the galvanometer deflections are in the direction of higher resistance or lower resistance in each zone initially affected by the flow of the fluid. The presence of a considerable zone of gas in the well is indicated by an apparent open circuit in the galvanometer circuit which sporadically is closed as the gas bubbles through the conditioning fluid.

If the well is still in the flowing stage it is not necessary to employ the gas lift apparatus shown in Figure 1. In that case at the start of operations, it is sufficient to close in the well by closing valved lines 24, 25 and 27, connecting the circulating system to these lines, and thereafter circulate the conditioning fluid under pressure into the bottom of the well in a fashion well known in this art. The array of electrodes is lubricated into the tubing and the measurement is made. In this case the flow of formation fluid into the well is caused to occur merely by opening valve 27 after the conditioning fluid has been circulated into the well.

If the well is a pumping well, two strings of tubing are used, one of which is the customary pumping string and houses the pump and sucker rods. The second string merely serves as a conduit through which the electrodes are run into the well, opposite the test section. The well is put on the pump after the conditioning fluid has been circulated through the well.

Those skilled in this art will recognize that there are numerous modifications and changes which can be made in the method and apparatus within the spirit of the invention. There is no intent to be limited to the embodiments shown and described. The invention is best described by the appended claims.

I claim:

1. In a method of detecting the location of a zone of ingress of salt water into a well, the steps which include producing a flow of electricity between the upper and lower boundaries of a region under investigation, and substantially simultaneously measuring and recording the potential drop across each of a plurality of uniform contiguous increments of the region under investigation.

2. Apparatus for detecting the location of a fluid within a well comprising a plurality of vertically and substantially uniformly spaced electrodes, said electrodes comprising a bottom electrode, a top electrode, and at least two intermediate electrodes, the top and bottom electrodes defining the region under investigation, means for supplying an electric current directly connected only to said top and bottom electrodes, and means associated with pairs of said electrodes for measuring an electrical characteristic of the fluids as a function of time across each of a plurality of uniform contiguous increments of fluid between adjacent pairs of electrodes, each of said intermediate electrodes being connected to said means for supplying electric current only through said means for measuring an electrical characteristic.

3. Apparatus according to claim 2 wherein the distance between adjacent electrodes is not less than approximately six inches and not more than about five feet.

4. In apparatus for detecting the location and character of produced well fluids, a circuit comprising, a plurality of uniformly spaced electrodes adapted to be vertically disposed within a region of investigation, the said electrodes including a top electrode, a bottom electrode, and at least two intermediate electrodes, a current generator directly connected to said top and bottom electrodes, each of said intermediate electrodes being connected to said current generator only through a means for indicating, as a function of time, the potential drop across each of a plurality of contiguous uniform increments of said region defined by alternate pairs of electrodes, and rheostat means for controlling the current output of the generator across the top and bottom electrodes.

DANIEL SILVERMAN.